US012684347B2

(12) United States Patent
Chi et al.

(10) Patent No.: US 12,684,347 B2
(45) Date of Patent: Jul. 14, 2026

(54) MULTI-DEVICE-MULTI-ACCOUNT MANAGEMENT SYSTEM, CLOUD SERVER, AND USER EQUIPMENT

(71) Applicant: BENQ CORPORATION, Taipei City (TW)

(72) Inventors: Chin-Jui Chi, Taipei City (TW); Pei-Wen Huang, Taipei City (TW)

(73) Assignee: BENQ CORPORATION, Taipei City (TW)

( * ) Notice: Subject to any disclaimer, the term of this patent is extended or adjusted under 35 U.S.C. 154(b) by 323 days.

(21) Appl. No.: 18/141,491

(22) Filed: May 1, 2023

(65) Prior Publication Data

US 2024/0259798 A1 Aug. 1, 2024

(30) Foreign Application Priority Data

Jan. 30, 2023 (TW) ................................. 112103155

(51) Int. Cl.
*H04W 12/06* (2021.01)
*H04W 12/00* (2021.01)

(52) U.S. Cl.
CPC ......... *H04W 12/06* (2013.01); *H04W 12/009* (2019.01)

(58) Field of Classification Search
CPC ............................ H04W 12/06; H04W 12/009
See application file for complete search history.

(56) References Cited

U.S. PATENT DOCUMENTS

| | | | |
|---|---|---|---|
| 10,075,450 B2 * | 9/2018 | Bush ................... | H04L 63/0838 |
| 10,129,242 B2 * | 11/2018 | DeWeese .............. | H04W 12/37 |

| | | | |
|---|---|---|---|
| 2013/0219479 A1 * | 8/2013 | DeSoto .............. | G06Q 20/4014 |
| | | | 726/6 |
| 2014/0149771 A1 | 5/2014 | Krishna et al. | |
| 2014/0195927 A1 * | 7/2014 | DeWeese ................ | G06F 21/10 |
| | | | 715/750 |
| 2015/0067805 A1 * | 3/2015 | Martin ................ | H04L 67/1095 |
| | | | 726/7 |
| 2016/0294806 A1 * | 10/2016 | Du .......................... | H04L 63/08 |
| 2016/0308863 A1 * | 10/2016 | Burch ................... | H04L 63/123 |
| 2016/0330746 A1 * | 11/2016 | Mehrabanzad ....... | H04L 67/535 |
| 2016/0352752 A1 * | 12/2016 | Bush ................... | H04L 63/0838 |
| 2016/0353258 A1 * | 12/2016 | Stuntebeck ............. | H04L 51/18 |
| 2017/0048252 A1 * | 2/2017 | Straub ..................... | H04L 67/02 |
| 2017/0142094 A1 * | 5/2017 | Doitch ................... | G06F 21/41 |
| 2017/0288959 A1 * | 10/2017 | Kelley ................. | H04L 67/306 |
| 2017/0317879 A1 * | 11/2017 | Wei ..................... | H04L 41/0813 |
| 2018/0197144 A1 * | 7/2018 | Frank ................... | H04L 63/104 |

(Continued)

OTHER PUBLICATIONS

DMS Local user manual_Oct. 21, 2019.

(Continued)

*Primary Examiner* — Blake I Narramore

(57) ABSTRACT

A multi-device-multi-account management system includes: a cloud server and a plurality of user equipment communicating with the cloud server. The cloud server includes an AMS for providing a plurality of log-in options and a DMS for managing the plurality of user equipment. The plurality of log-in options include after a user account logging in, the AMS providing automatic introducing personal information into an user equipment which the user account logs in. The AMS generates a QR code which is corresponding to the user account. The user equipment scans the QR code to log into the AMS.

17 Claims, 9 Drawing Sheets

50

(56)        References Cited

U.S. PATENT DOCUMENTS

2021/0117135 A1*   4/2021   Suzuki ................. G06F 3/1205
2021/0225131 A1*   7/2021   Van Beek Faletti .. G07F 19/211
2024/0184282 A1*   6/2024   Dev ....................... G06N 20/20

OTHER PUBLICATIONS

Interactive Flat Panel user manual_Feb. 10, 2021.
Office action of counterpart application by Taiwan IP Office on Jan.
29, 2024.

* cited by examiner

50

610

610

610

620

630

640

MULTI-DEVICE-MULTI-ACCOUNT MANAGEMENT SYSTEM, CLOUD SERVER, AND USER EQUIPMENT

This application claims the benefit of Taiwan application Serial No. 112103155, filed Jan. 30, 2023, the subject matter of which is incorporated herein by reference.

TECHNICAL FIELD

The disclosure relates in general to a multi-device-multi-account management system, a cloud server and a user equipment.

BACKGROUND

Digital education draws high interest. In digital education, installing interactive whiteboard (or interactive flat platform (IFP) in classrooms will have large impact on education scene, which raises learning motivation of students.

IFPs play important role in linking traditional education and digital education. Via interactive flat platform, teachers may quickly use multi-media resources and students may cooperate on touch panels. Further, classes are like gaming and thus students will have high interest in learning.

However, in teaching scenes, users (i.e. teachers) usually teach in several classrooms and each classroom has an IFP. However, when a teacher teaches in one of the classrooms, the teacher has to manually key in the account and password; sets the IFP in the classroom as the teacher's favorite usage scenario; and installs every application program in need. When the teacher goes to another classroom, the teacher has to manually key in the account and password; sets the IFP in the classroom as the teacher's favorite usage scenario; and installs every application program in need again.

This usage scenario is not friendly. Therefore, there is an effect to improve unfriendly usage experience in prior art.

SUMMARY

According to one embodiment, a multi-device-multi-account management system is provided. The multi-device-multi-account management system includes: a cloud server and a plurality of user equipment communicating with the cloud server. The cloud server includes an account management system (AMS) for providing a plurality of log-in options and a device management solution (DMS) for managing the plurality of user equipment. The plurality of log-in options includes: after a user account logs in, the AMS providing automatic loading user information into an user equipment which the user account logs in; the AMS providing that a plurality of user accounts are allowable to log in the same user equipment among the plurality of user equipment; and the AMS providing the same user account among the plurality of user accounts to selectively log in at least one user equipment among the plurality of user equipment; the at least one user equipment accepting an account and a password input by a user for the user account logging in the AMS via the at least one user equipment; the at least one user equipment scanning a card and bonding the card to the user account for the user account to log in the AMS via the at least one user equipment; the AMS generating a QR code based on the user account, the QR code is corresponding to the user account; and the user equipment scanning the QR code to log into the AMS.

According to another embodiment, a cloud server communication with a plurality of user equipment is provided.

The cloud server includes: a processor; a communication unit; and a storage unit, wherein the processor is coupled to and controls the communication unit and the storage unit; via the communication unit, the cloud server communicates with the plurality of user equipment; the storage unit stores an AMS and a DMS; the AMS provides a plurality of log-in options; after a user account logging in, the AMS providing automatic loading user information into an user equipment which the user account logs in; the AMS providing a plurality of user accounts are allowable to log in the same user equipment among the plurality of user equipment; and the AMS providing the same user account among plurality of user accounts to selectively log in at least one user equipment among the plurality of user equipment; the at least one user equipment accepting an account and a password input by a user for the user account to log in the AMS via the at least one user equipment; the at least one user equipment scanning a card and bonding the card to the user account for the user account logging in the AMS via the at least one user equipment; the AMS generating a QR code based on the user account, the QR code is corresponding to the user account; and the user equipment scanning the QR code to log into the AMS.

According to an alternative embodiment, a user equipment for a multi-device-multi-account management system including a cloud server is provided. The user equipment includes: a touch panel for receiving an account and a password input by a user and a user account logging in the cloud server; a camera for scanning a QR code corresponding to the user account; a NFC reader for reading a NFC card bonded with the user account; a RFID reader for reading a RFID card bonded with the user account; and a sensor for sensing environment data and returning to the cloud server.

Figure 1:
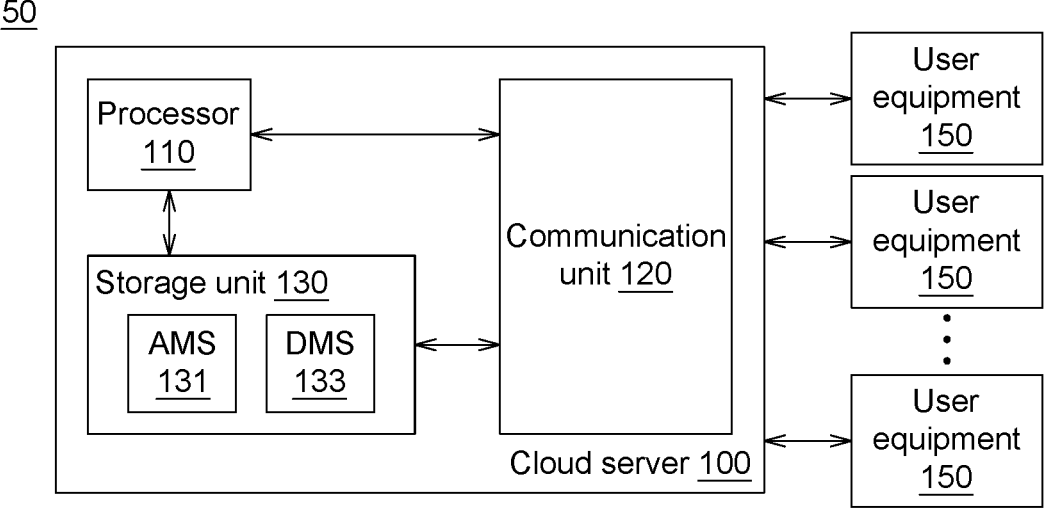
FIG. 1 shows a multi-device-multi-account management system according to one embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

FIG. 1 shows a multi-device-multi-account management system 50 according to one embodiment of the application. The multi-device-multi-account management system 50 includes a cloud server 100 and a plurality of user equipment 150. The user equipment 150 is implemented by an interactive whiteboard or interactive flat panel (IFP), which is not to limit the application.

The cloud server 100 includes a processor 110, a communication unit 120 and a storage unit 130.

The processor 110 is coupled to the communication unit 120 and the storage unit 130. The processor 110 controls the communication unit 120 and the storage unit 130.

Via the communication unit 120, the cloud server 100 is wireless and/or wired connected to the user equipment 150.

The storage unit 130 stores an Account Management System (AMS) 131 and a Device Management Solution (DMS) 133. The AMS 131 and the DMS 133 may be installed in different host computers of the cloud server 100.

In one embodiment of the application, the AMS 131 performs cloud backend management (or said cloud backstage management), for example but not limited by, personal cloud space.

In one embodiment of the application, the AMS 131 provides a plurality of personal login options including for example but not limited by, inputting account-password to login, bonding Near Field Communication (NFC) cards and then reading (scanning) the bonded NFC cards to login, bonding Radio-frequency identification (RFID) cards and then reading the bonded RFID cards to login, bonding QR codes and then reading the bonded QR codes to login.

In one embodiment of the application, the AMS 131 automatically introduces (loads) user information of the user account to the user equipment that the user account logs in after the user account logs in. User information includes for example but not limited by, desktop settings, web favorite settings, application program (APP) display setting, machine control settings etc.

In one embodiment of the application, the AMS 131 provides that multiple user accounts are allowed to login into the same IFP 150, that the same user account is allowed to login into several IFP 150, that the same user account is allowed to selectively log into at least one user equipment and that the same user account is allowed to log in across different platforms (android/windows . . . ) or bond different platform accounts.

In one embodiment of the application, the AMS 131 performs user account privilege management. User account privilege management includes for example but not limited by, account control privilege, account usable time, account group relationship etc.

In one embodiment of the application, the AMS 131 performs encryption data protection. For example but not limited by, when the user account logs out from the at least one user equipment, the AMS 131 empties user information temporally stored in the at least one user equipment. Alternatively, in case that the setting is to save user information temporally stored in the at least one user equipment, when different user account logs into the at least one user equipment, different user account is not allowed to see or access user information of all the other user accounts.

In one embodiment of the application, the DMS 133 monitors all user equipment (in the following, the user equipment may be also referred as a machine) of the system and fetches machine data for making dashboard reports. The dashboard reports include for example but not limited by, machine states, user equipment sensor data, service data and etc. Machine states include for example but not limited by, power on duration of the user equipment, power consumption and etc. The user equipment sensor data includes for example but not limited by, $CO_2$ concentration data, PM2.5 concentration data and etc.

In one embodiment of the application, the DMS 133 controls machine, remotely sets machine states (for example but not limited by, user equipment brightness and/or volume and etc.), and sets power-on and power-off of the user equipment and etc.

In one embodiment of the application, the DMS 133 controls machine, installs and/or updates and/or deletes application programs of the user equipment, remotely controls the user equipment for playing (power-point files, or audio files) and starts to operate the machine and etc.

In one embodiment of the application, the DMS 133 manage a user equipment group relationship of the plurality of user equipment.

In one embodiment of the application, the DMS 133 performs Over-the-Air Technology (OTA) automatic software updates.

Figure 2:
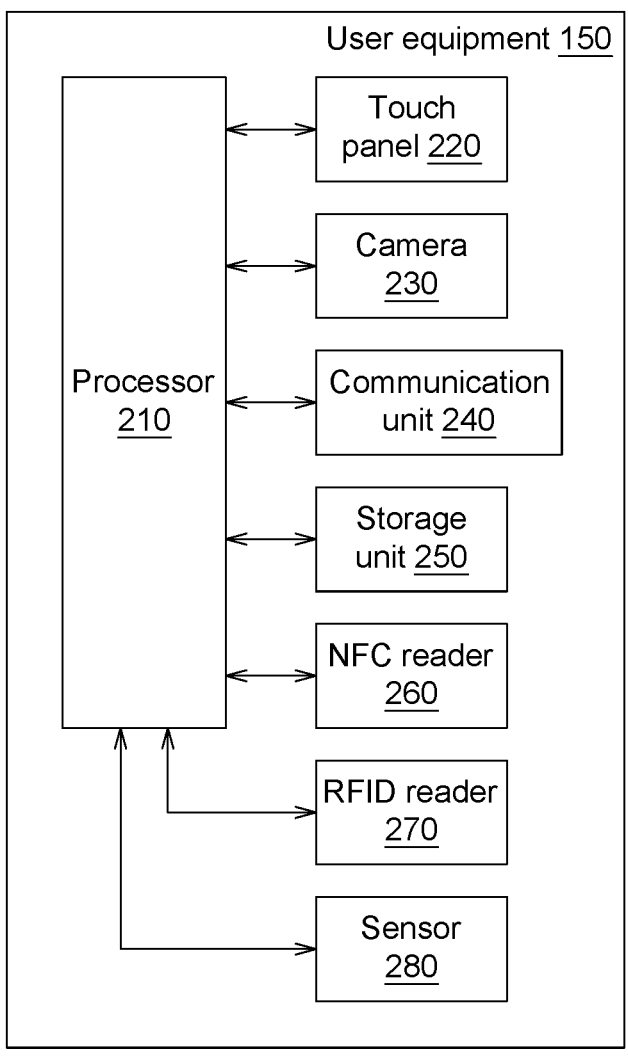
FIG. 2 shows a functional block diagram of the user equipment according to one embodiment of the application.

FIG. 2 shows a functional block diagram of the user equipment 150 according to one embodiment of the application. The user equipment 150 includes a processor 210, a touch panel 220, a camera 230, a communication unit 240, a storage unit 250, a Near Field Communication (NFC) reader 260, a Radio Frequency Identification (RFID) reader 270 and a sensor 280.

The processor 210 is coupled and controls the touch panel 220, the camera 230, the communication unit 240, the storage unit 250, the NFC reader 260, the RFID reader 270 and the sensor 280.

The touch panel 220 has touch functions and the user may touch, select and input on the touch panel 220. That is, the user may input the user account and the password via the touch panel 220.

The camera 230 takes photos and scans, for example QR code for user account logging in. That is, QR code is one of logging-in options and details are described later. QR code may be displayed on the user mobile phone or printed on paper.

The communication unit 240 communications with the cloud server 100 in wireless or wired.

The storage unit 250 may store operation systems (for example but not limited by, android system), user data, application programs and etc.

The NFC reader 260 may read NFC card for user account login. That is, NFC card is one of logging-in options.

The RFID reader 270 may read RFID card for user account login. That is, RFID card is one of logging-in options.

The sensor 280 may sense environment data and return to the cloud server 100. For example but not limited by, the sensor 280 may sense environment $CO_2$ concentration data or PM2.5 concentration data and etc.

Figure 3:
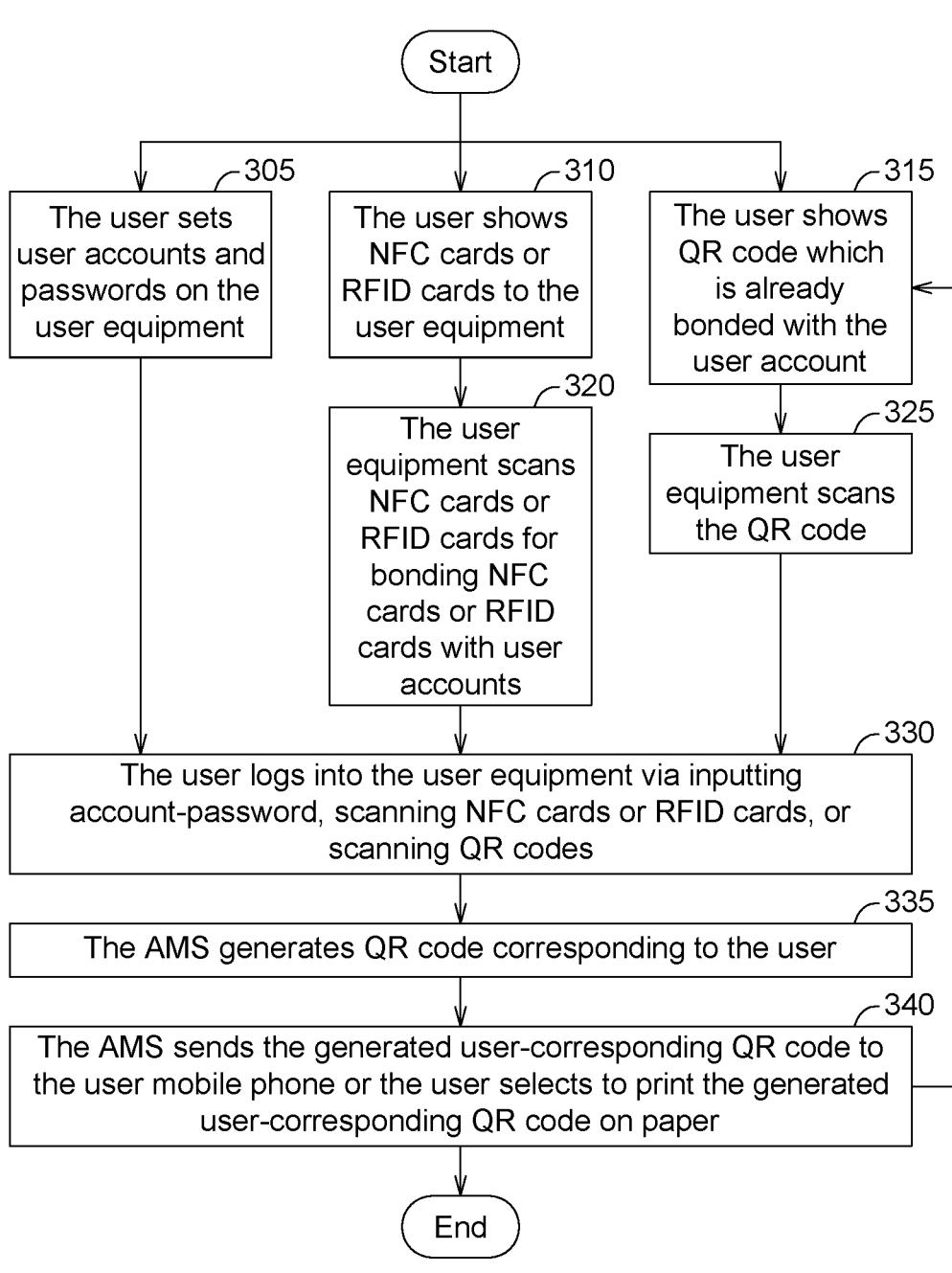
FIG. 3 shows a user account login flow according to one embodiment of the application.

FIG. 3 shows a user account login flow according to one embodiment of the application. As shown in FIG. 3, one embodiment of the application provides a plurality of user login options including for example but not limited by, inputting account-password to login, bonding NFC cards and then reading the bonded NFC cards to login, bonding RFID cards and then reading the bonded RFID cards to login, bonding QR codes and then reading the bonded QR codes to login.

In step 305, the user sets user accounts and passwords on the user equipment 150.

In step 310, the user shows NFC cards or RFID cards to the user equipment 150. In step 320, the user equipment 150 scans NFC cards or RFID cards for bonding NFC cards or RFID cards with user accounts.

In step 315, the user shows QR code which is already bonded with the user account. In step 325, the user equipment 150 scans the QR code.

In step 330, the user logs into the user equipment 150 via inputting account-password, scanning NFC cards or RFID cards, or scanning QR codes.

In step 335, the AMS 131 generates QR code corresponding to the user. For example but not limited by, the QR code is dedicated to the user account.

In step 340, the AMS 131 sends the generated user-corresponding QR code to the user mobile phone or the user selects to print the generated user-corresponding QR code on paper.

In one embodiment of the application, after the user inputs the account-password or after NFC cards and/or RFID cards are bonded, the system generates and outputs QR codes. By so, users have more logging in options.

In case that the user logs in by inputting account-password or by scanning NFC cards or RFID cards, when the AMS 131 does not generate user-corresponding QR codes yet, the AMS 131 generates the user-corresponding QR codes; when the AMS 131 already generates the user-corresponding QR codes, neither the step 335 nor the step 340 executes again.

From FIG. 3, in one embodiment of the application, as for bonding with user accounts, user IDs (UIDs) are read to bond with user accounts and thus NFC cards or RFID cards are allowed to be used in logging in without any need to modify contents of NFC cards or RFID cards.

From FIG. 3, in one embodiment of the application, as for bonding with user accounts, after QR codes are bonded, users may pass ID verification by scanning QR codes stored in user mobile phones or QR codes printed on paper. By so, users may log in even if users do not carry NFC cards or RFID cards, and users have high convenient in logging in.

From FIG. 3, comparing that user's accounts or passwords may have the potential probability to be hacked, which negatively affects user security, in one embodiment of the application, QR codes stored in user mobile phones, or QR codes printed on paper, or NFC cards or RFIC cards are not easily to be hacked and thus have high user data security.

Figure 4A:
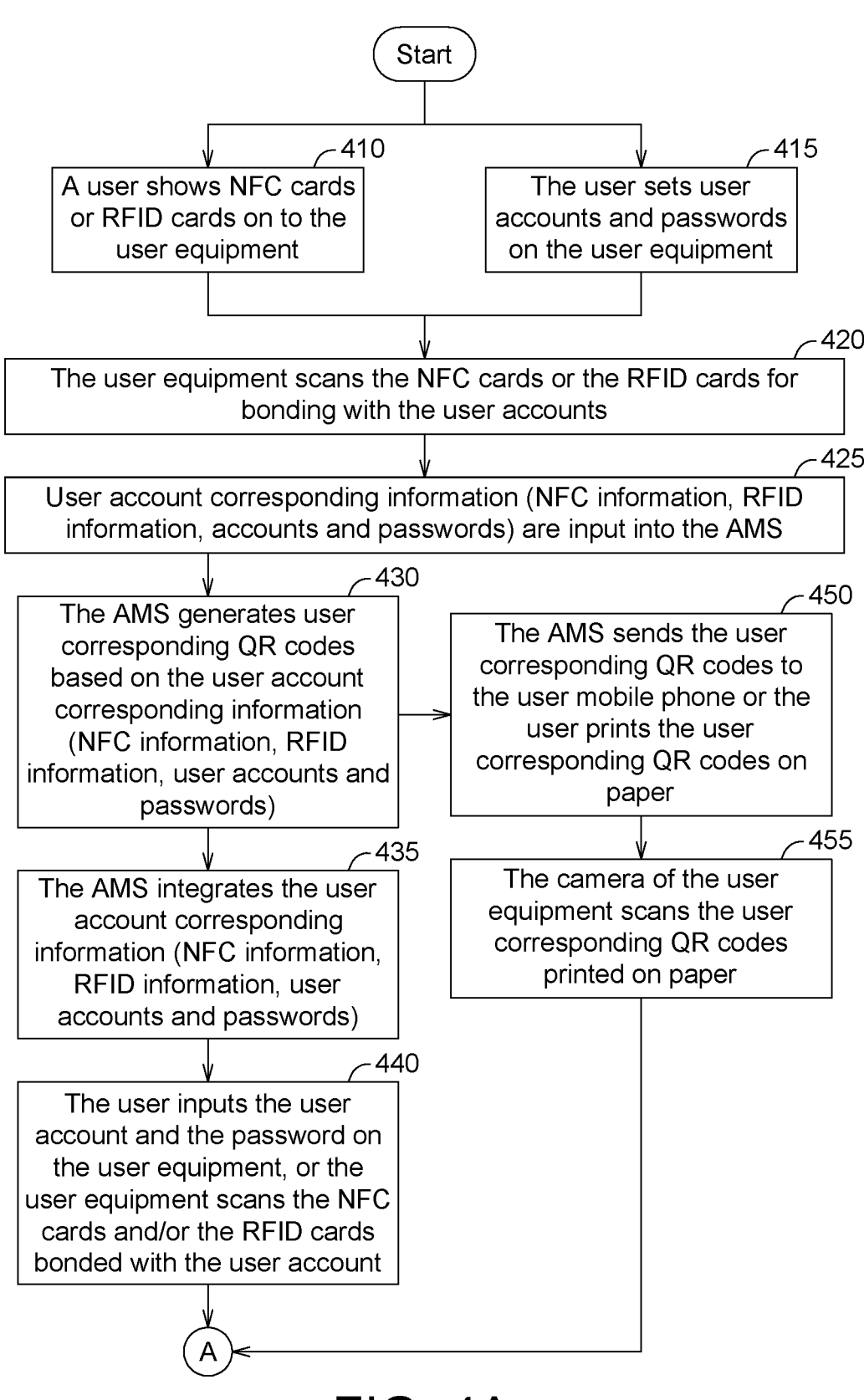
FIG. 4A and FIG. 4B show flow of creating user accounts and linking to AMS and DMS according to one embodiment of the application.
Figure 4B:
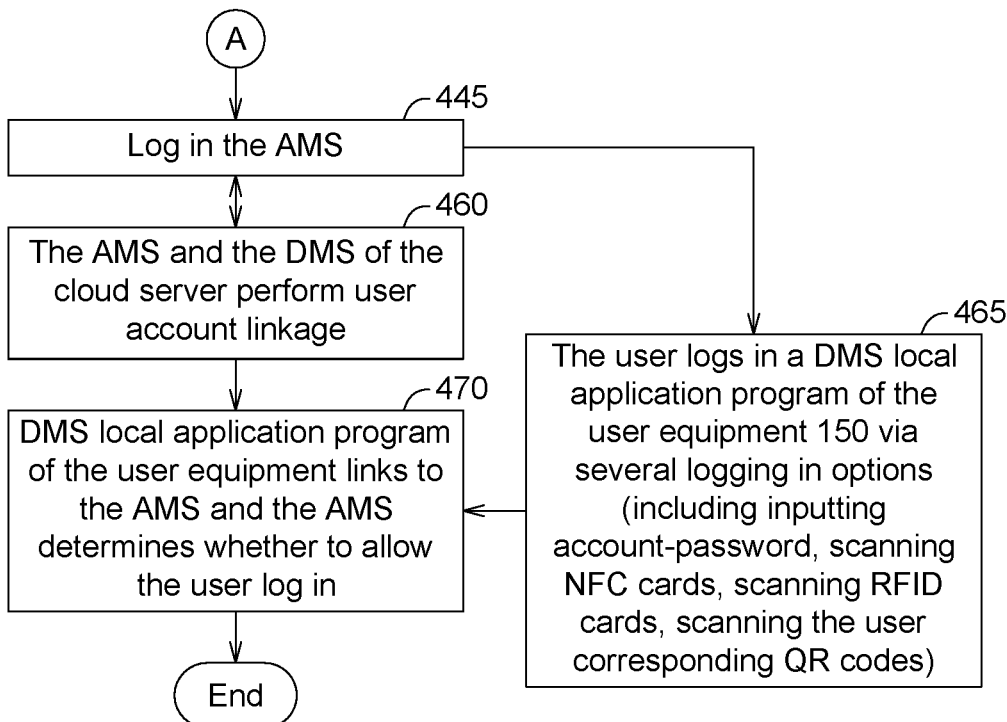

FIG. 4A and FIG. 4B show flow of creating user accounts and linking to AMS and DMS according to one embodiment of the application. In step 410, a user shows NFC cards or RFID cards on to the user equipment 150. In step 415, the user sets user accounts and passwords on the user equipment 150. In step 420, the user equipment 150 scans the NFC cards or the RFID cards for bonding with the user accounts.

In step 425, user account corresponding information (NFC information, RFID information, accounts and passwords) are input into the AMS 131.

In step 430, the AMS 131 generates user corresponding QR codes based on the user account corresponding information (NFC information, RFID information, user accounts and passwords). In step 435, the AMS 131 integrates the user account corresponding information (NFC information, RFID information, user accounts and passwords). In step 440, the user may input the user account and the password on the user equipment 150, or the user operates the user equipment 150 to scan the NFC cards and/or the RFID cards bonded with the user account. By so, the user may log in the AMS 131 via the user equipment (step 445).

In step 450, the AMS 131 sends the user corresponding QR codes to the user mobile phone or the user may select to print the user corresponding QR codes on paper. In step 455, the camera 230 of the user equipment scans the user corresponding QR codes printed on paper and thus the user may log in the AMS 131 via the user equipment (step 445).

In step 460, the AMS 131 and the DMS 133 of the cloud server 100 perform user account linkage.

In step 465, the user logs in a DMS local application program of the user equipment 150 via several logging in options (including, for example but not limited by, inputting account-password, scanning NFC cards, scanning RFID cards, scanning the user corresponding QR codes).

In step 470, DMS local application program of the user equipment 150 links to the AMS 131 and the AMS 131 determines whether to allow the user log in.

Figure 5:
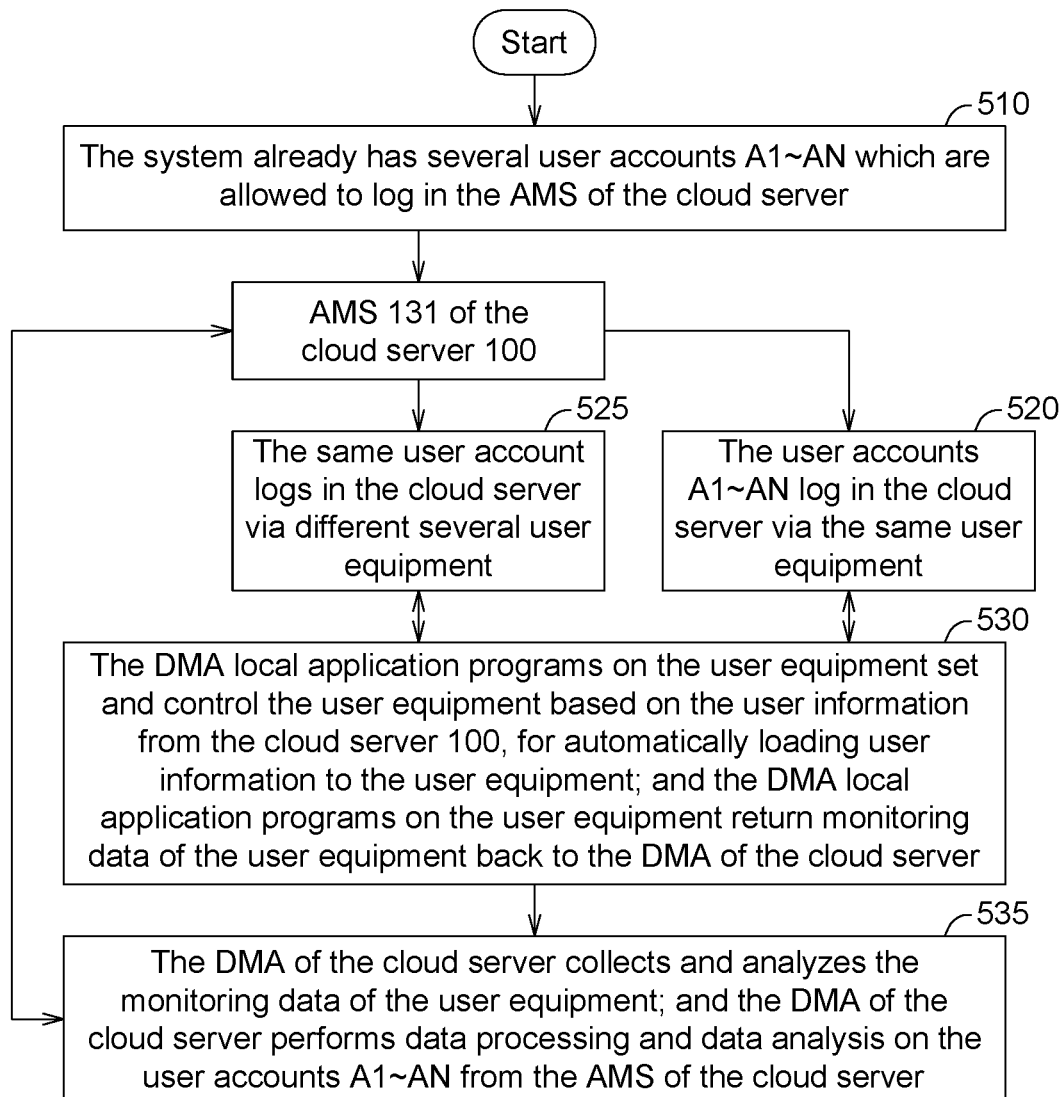
FIG. 5 shows a cloud backend management flow according to one embodiment of the application.

FIG. 5 shows a cloud backend management flow according to one embodiment of the application. In step 510, the system already has several user accounts A1~AN which are allowed to log in the AMS 131 of the cloud server 100.

In step 520, the user accounts A1~AN may log in the cloud server 100 via the same user equipment 150. Or, in step 525, the same user account may log in the cloud server 100 via different several user equipment 150.

In step 530, the DMA local application programs on the user equipment 150 may set and control the user equipment 150 based on the user information from the cloud server 100, for automatically introducing (loading) user information to the user equipment; and the DMA local application programs on the user equipment 150 may return monitoring data of the user equipment 150 back to the DMA 133 of the cloud server 100, wherein the monitoring data including for example but not limited by, volume, brightness, power-on or power-off state and etc.

In step 535, the DMA 133 of the cloud server 100 collects and analyzes the monitoring data of the user equipment 150; and the DMA 133 of the cloud server 100 performs data processing and data analysis on the user accounts A1~AN from the AMS 131 of the cloud server 100.

Figure 6A:
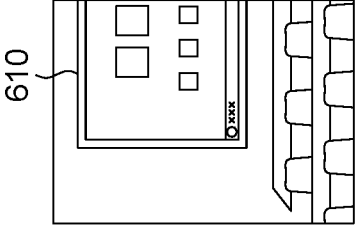
FIG. 6A and FIG. 6B show multi-account-multi-device management according to one embodiment of the application.
Figure 6A:
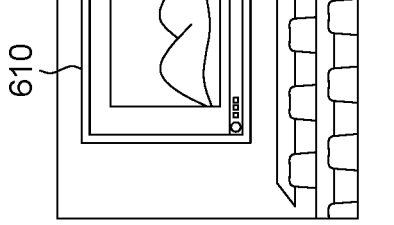
Figure 6A:
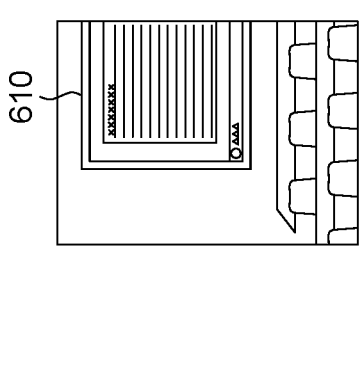
Figure 6B:
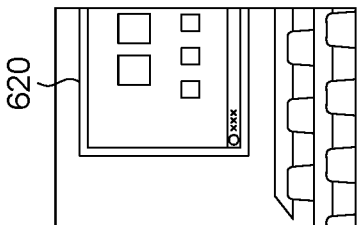
Figure 6B:
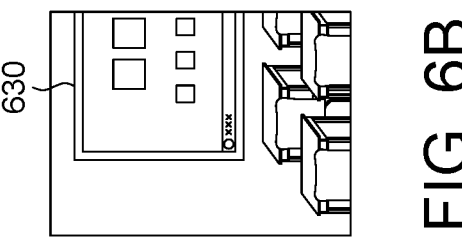
Figure 6B:
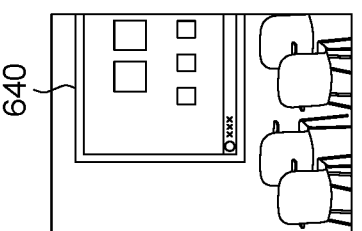

FIG. 6A and FIG. 6B show multi-account-multi-device management according to one embodiment of the application. As shown in FIG. 6A, when different user accounts log in the same user equipment 610, respective user information of the user accounts are introduced into the same user equipment 610 via the DMS local application programs installed in the user equipment 610. As shown in FIG. 6B, when the same user account logs into different several user equipment 620~640, the user information of the user account is introduced into the different several user equipment 620~640 via the DMS local application programs installed in the user equipment 620~640.

From FIG. 5, FIG. 6A and FIG. 6B, in one embodiment of the application, in cloud backend management, the same user equipment may allow multiple user accounts to log in while the user accounts are not allowed to access or watch the respective user account information (personal information) of all other user accounts, wherein the user account information (personal information) includes for example but not limited by, desktop settings, web favorite settings, file display settings, APP display settings, machine control settings and etc.

From FIG. 5, FIG. 6A and FIG. 6B, in one embodiment of the application, in cloud backend management, the same user account are allowed to log in several different user equipment even in different operation systems (android, IOS etc.), or bond to other platform accounts, which are still within the spirit and scope of the application.

In one embodiment of the application, user accounts are bonded with the DMS for setting/controlling/monitoring different several user equipment. Also, data from different several user equipment is integrated for making dashboard reports (machine states, sensor data, service data and etc).

Figure 7:
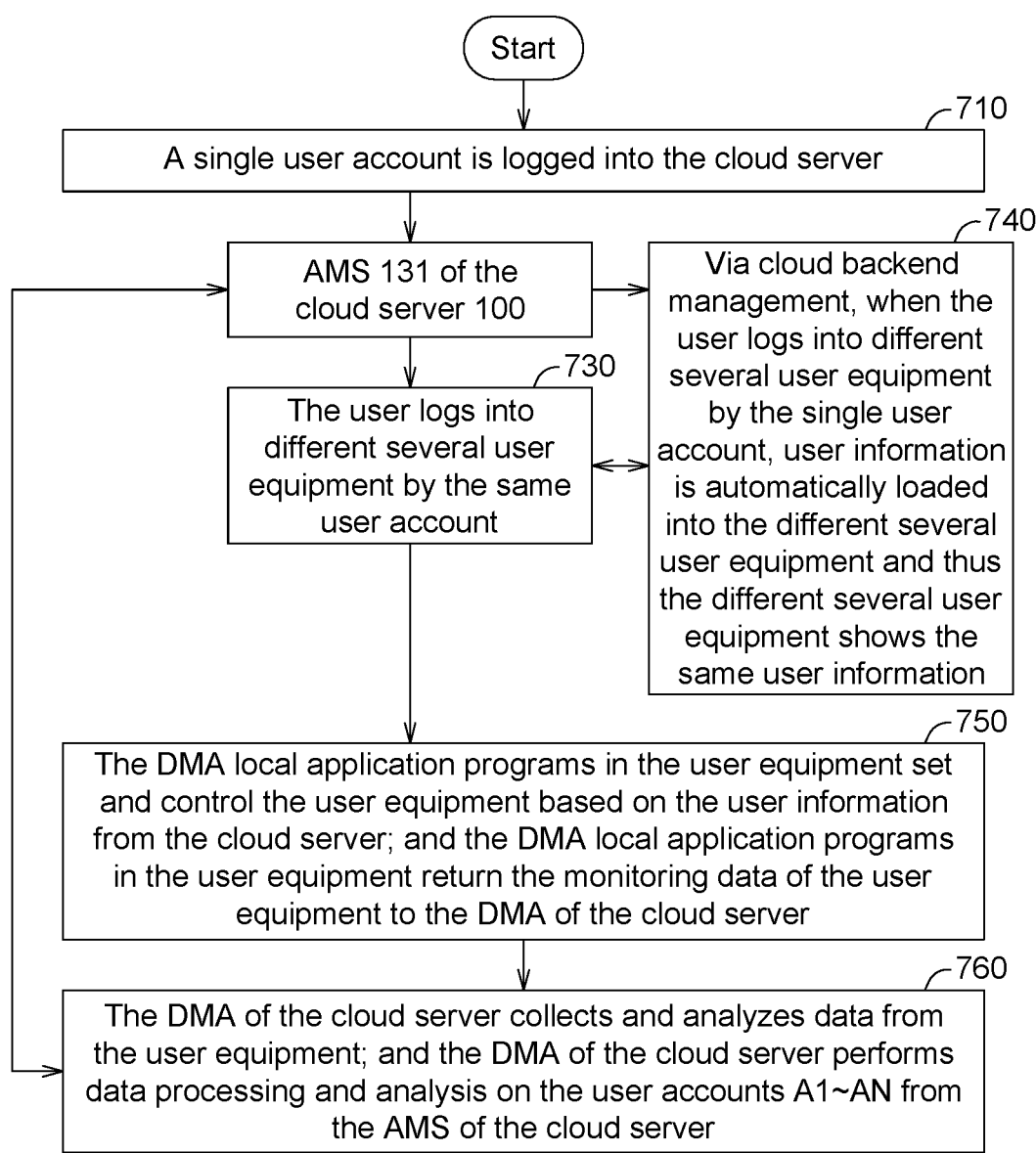
FIG. 7 shows flow of logging a single user account into several different user equipment according to one embodiment of the application.

FIG. 7 shows flow of logging a single user account into several different user equipment according to one embodiment of the application. In step 710, a single user account is logged into the cloud server 100.

In step 730, the user logs into different several user equipment by the same user account. In step 740, via cloud backend management, when the user logs into different several user equipment by the single user account, user information is automatically introduced (loaded) into the different several user equipment and thus the different several user equipment shows the same user information, wherein the user information includes for example but not limited by, files, cloud data, desktop favorite environment, usually-used application programs, system settings, linkage and etc. For example, the user information of the user A recorded in the cloud server 100 shows that the user A prefers a first application program and a second application program. A first user equipment installs the first application program but not the second application program; and a second user equipment installs the second application program but not the first application program. When the user A logs into the first user equipment and the second user equipment, via cloud backend management, the first user equipment automatically downloads and installs the second application program, and the second user equipment automatically downloads and installs the first application program. Therefore, the user A does not have to manually operate the first user equipment to download and install the second application program in the first user equipment, and also the user A does not have to manually operate the second user equipment to download and install the first application program in the second user equipment. By so, the user A may use both the first and the second application programs on both the first and the second user equipment.

That is, in one embodiment of the application, when the same user account logs in different user equipment, via cloud backend management, user information of the user account is automatically loaded into each of the logged-in user equipment, and thus each of the logged-in user equipment may use the user information of the user account. Therefore, as for the user, each of the logged-in user equipment has the same usage scenario, and the user does not have to manually adjust the usage scenario in each of the user equipment.

In step 750, the DMA local application programs in the user equipment set and control the user equipment based on the user information from the cloud server 100; and the DMA local application programs in the user equipment return the monitoring data of the user equipment to the DMA 133 of the cloud server 100, wherein the monitoring data includes, for example but not limited by, volume, brightness, power on/off states, and etc.

In step 760, the DMA 133 of the cloud server 100 collects and analyzes data from the user equipment; and the DMA

133 of the cloud server 100 performs data processing and analysis on the user accounts A1~AN from the AMS 131 of the cloud server 100.

From FIG. 7, in one embodiment of the application, personal favorite usage scenario are automatically loaded, represented and operated in different several user equipment even without user manual adjusting.

Further, in one of the settings, after the user account logs out, data and information registered in the user equipment are all discarded or emptied without saving. Alternatively, in another of the settings, after the user account logs out, data and information registered in the user equipment are all kept but any other user account is not allowed to access or watch data and information of all the other user accounts on the same user equipment.

From FIG. 7, in one embodiment of the application, after logging in different several user equipment by the same user account, the different several user equipment are concurrently set and controlled, or machine states of different several user equipment are set remotely or monitored. Also, easy operations (such as files play or documents display and operations) are allowed on different several user equipment.

Figure 8:
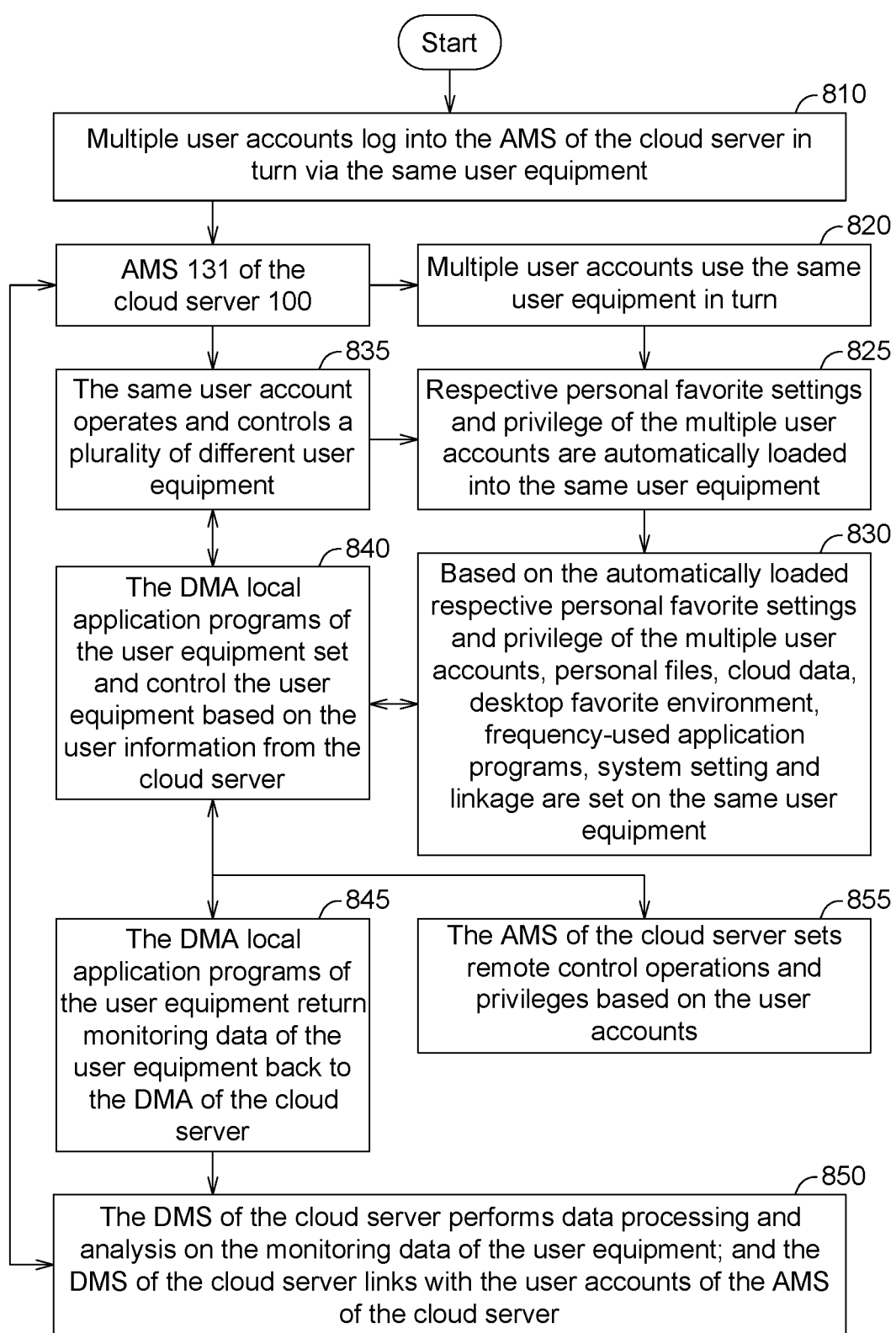
FIG. 8 shows an operation flow of logging in system by multi-account according to one embodiment of the application.

FIG. 8 shows an operation flow of logging in system by multi-account according to one embodiment of the application. In step 810, multiple user accounts log into the AMS 131 of the cloud server 100 in turn via the same user equipment. In step 820, multiple user accounts use the same user equipment in turn. In step 825, respective personal favorite settings and privilege of the multiple user accounts are automatically loaded or introduced into the same user equipment. In step 830, based on the automatically loaded respective personal favorite settings and privilege of the multiple user accounts, personal files, cloud data, desktop favorite environment, frequency-used application programs, system setting and linkage are set on the same user equipment.

In step 835, the same user account operates and controls a plurality of different user equipment. In step 840, the DMA local application programs of the user equipment set and control the user equipment based on the user information from the cloud server 100.

In step 845, the DMA local application programs of the user equipment return monitoring data of the user equipment back to the DMA 133 of the cloud server 100, wherein the monitoring data includes, for example but not limited by, volume, brightness, power-on-off states and etc.

In step 850, the DMS 133 of the cloud server 100 performs data processing and analysis on the monitoring data of the user equipment; and the DMS 133 of the cloud server 100 links with the user accounts of the AMS 131 of the cloud server 100.

In step 855, the AMS 131 of the cloud server 100 sets remote control operations and privileges based on the user accounts.

In one embodiment of the application, the multi-device-multi-account management system, the cloud server and the user equipment achieve multi-account management, multi-device file management in considering personal favorite. In one embodiment of the application, when in usage, the multi-device-multi-account management system, the cloud server and the user equipment may link a plurality of systems, and user information is automatically loaded (or introduced) when the user account logs into several different user equipment.

In one embodiment of the application, the multi-device-multi-account management system, the cloud server and the user equipment have a plurality account bonding options, for example but not limited by, bonding NFC cards, bonding RFID cards, bonding QR codes, bonding account-passwords and etc. Thus, user convenience is improved.

In one embodiment of the application, as for the multi-device-multi-account management system, the cloud server and the user equipment, in cloud backend management, user information are also managed, wherein user information includes for example but not limited by, desktop setting, web favorite settings, file appearance settings, application program icon appearance settings, machine control settings and etc.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A multi-device-multi-account management system including:
  a cloud server; and
  a plurality of user equipment communicating with the cloud server,
  the cloud server including an account management system (AMS) for providing a plurality of log-in options and a device management solution (DMS) for managing the plurality of user equipment;
  the plurality of log-in options including:
  after a user account logs in, the AMS providing automatic loading user information from the cloud server into any of the plurality of user equipment on which the user account logs in, thereby synchronizing personal environment settings across the plurality of user equipment, wherein the automatic loading includes automatically downloading and installing application programs that are absent on the logged-in user equipment but recorded in environment data of the user account;
  the AMS providing that a plurality of user accounts allowable to log in the user equipment among the plurality of user equipment; and the AMS providing the user account among the plurality of user accounts to selectively log in at least one user equipment among the plurality of user equipment;
  the at least one user equipment accepting an account and a password input by a user for the user account to log in the AMS via the at least one user equipment;

the at least one user equipment scanning a card and bonding the card to the user account for the user account logging in the AMS via the at least one user equipment;
  the AMS generating a QR code based on the user account, the QR code is corresponding to the user account; and
  the user equipment directly scanning the QR code without requiring an auxiliary device to complete login into the AMS.

2. The multi-device-multi-account management system according to claim 1, wherein
  the AMS performs cloud backend management;
  the AMS performs account privilege management including an account control privilege, an account usable time and an account group relationship;
  the AMS performs encryption data protection,
  wherein when the user account logs out from the at least one user equipment, the AMS empties all user information of the user account temporally stored in the at least one user equipment; or
  wherein user information of the user account is saved in the at least one user equipment even when the user account logs out, when a different user account logs into the at least one user equipment, the different user account is not allowed to see or access the user information of the user account which is already logged out; and
  the AMS provides the user account to log in across different platforms or to bond different platform accounts.

3. The multi-device-multi-account management system according to claim 1, wherein
  the DMS monitors the plurality of user equipment and fetches machine data for making dashboard reports, the dashboard reports including machine states, user equipment sensor data and service data;
  the DMS controls the plurality of user equipment, remotely sets machine states, and sets power-on and power-off of the plurality of user equipment;
  the DMS installs and/or updates and/or deletes application programs of the plurality of user equipment, and remotely controls the plurality of user equipment;
  the DMS manages a user equipment group relationship of the plurality of user equipment; and
  the DMS performs Over-the-Air Technology (OTA) automatic software updates.

4. The multi-device-multi-account management system according to claim 1, wherein the user information of the user account includes desktop settings, web favorite settings, file display settings, application program (APP) display settings, or machine control settings.

5. The multi-device-multi-account management system according to claim 1, wherein the QR code is dedicated to the user account.

6. The multi-device-multi-account management system according to claim 1, wherein the QR code corresponding to the user account is sent to a user mobile phone or printed on paper.

7. The multi-device-multi-account management system according to claim 1, wherein
  when the user account logs in a first user equipment of the plurality of user equipment, the AMS automatically loads the user information of the user account to the first user equipment; and when the user account logs in a second user equipment of the plurality of user equipment, the AMS automatically loads the user information of the user account to the second user equipment.

8. The multi-device-multi-account management system according to claim 1, wherein when a first user account logs in a first user equipment of the plurality of user equipment, the AMS automatically loads a first user information of the first user account to the first user equipment; and when a second user account logs in the first user equipment of the plurality of user equipment, the AMS automatically loads a second user information of the second user account to the first user equipment;

wherein the second user account is not allowed to see or access the first user information of the first user account; and the first user account is not allowed to see or access the second user information of the second user account.

9. The multi-device-multi-account management system according to claim 1, wherein the user equipment includes:

a touch panel for receiving the user account and the password input by the user;

a camera for scanning the QR code corresponding to the user account;

a NFC reader for reading a NFC card bonding with the user account;

a RFID reader for reading a RFID card bonding with the user account; and a sensor for sensing environment data and returning to the cloud server.

10. A cloud server in communication with a plurality of user equipment, the cloud server including:

a processor;

a communication unit; and a storage unit, wherein the processor is coupled to and controls the communication unit and the storage unit;

via the communication unit, the cloud server communicates with the plurality of user equipment;

the storage unit stores an AMS and a DMS;

the AMS provides a plurality of log-in options;

after a user account logging in, the AMS providing automatic loading user information from the cloud server into any of the plurality of user equipment on which the user account logs in, thereby synchronizing personal environment settings across the plurality of user equipment, wherein the automatic loading includes automatically downloading and installing application programs that are absent on the logged-in user equipment but recorded in environment data of the user account;

the AMS providing a plurality of user accounts allowable to log in the user equipment among the plurality of user equipment; and the AMS providing the user account among the plurality of user accounts to selectively log in at least one user equipment among the plurality of user equipment;

the at least one user equipment accepting an account and a password input by a user for the user account to log in the AMS via the at least one user equipment;

the at least one user equipment scanning a card and bonding the card to the user account for the user account logging in the AMS via the at least one user equipment;

the AMS generating a QR code based on the user account, the QR code is corresponding to the user account; and the user equipment directly scanning the QR code without requiring an auxiliary device to complete login into the AMS.

11. The cloud server according to claim 10, wherein the AMS performs cloud backend management;

the AMS performs account privilege management including an account control privilege, an account usable time and an account group relationship;

the AMS performs encryption data protection, wherein when the user account logs out from the at least one user equipment, the AMS empties all user information of the user account temporally stored in the at least one user equipment; or wherein all user information of the user account is saved in the at least one user equipment even when the user account logs out, when a different user account logs into the at least one user equipment, the different user account is not allowed to see or access the user information of the user account which is already logged out; and the AMS provides the user account to log in across different platforms or to bond different platform accounts.

12. The cloud server according to claim 10, wherein the DMS monitors the plurality of user equipment and fetches machine data for making dashboard reports, the dashboard reports including machine states, user equipment sensor data and service data;

the DMS controls the plurality of user equipment, remotely sets machine states, and sets power-on and power-off of the plurality of user equipment;

the DMS installs and/or updates and/or deletes application programs of the plurality of user equipment, and remotely controls the plurality of user equipment;

the DMS manages a user equipment group relationship of the plurality of user equipment; and the DMS performs Over-the-Air Technology (OTA) automatic software updates.

13. The cloud server according to claim 10, wherein the user information of the user account includes desktop settings, web favorite settings, file display settings, application program (APP) display settings, or machine control settings.

14. The cloud server according to claim 10, wherein the QR code is dedicated to the user account.

15. The cloud server according to claim 10, wherein the QR code corresponding to the user account is sent to a user mobile phone or printed on paper.

16. The cloud server according to claim 10, wherein when the user account logs in a first user equipment of the plurality of user equipment, the AMS automatically loads the user information of the user account to the first user equipment; and when the user account logs in a second user equipment of the plurality of user equipment, the AMS automatically loads the user information of the user account to the second user equipment.

17. The cloud server according to claim 10, wherein when a first user account logs in a first user equipment of the plurality of user equipment, the AMS automatically loads a first user information of the first user account to the first user equipment; and when a second user account logs in the first user equipment of the plurality of user equipment, the AMS automatically loads a second user information of the second user account to the first user equipment;

wherein
the second user account is not allowed to see or access the
    first user information of the first user account; and the
    first user account is not allowed to see or access the
    second user information of the second user account.

* * * * *